though the device.

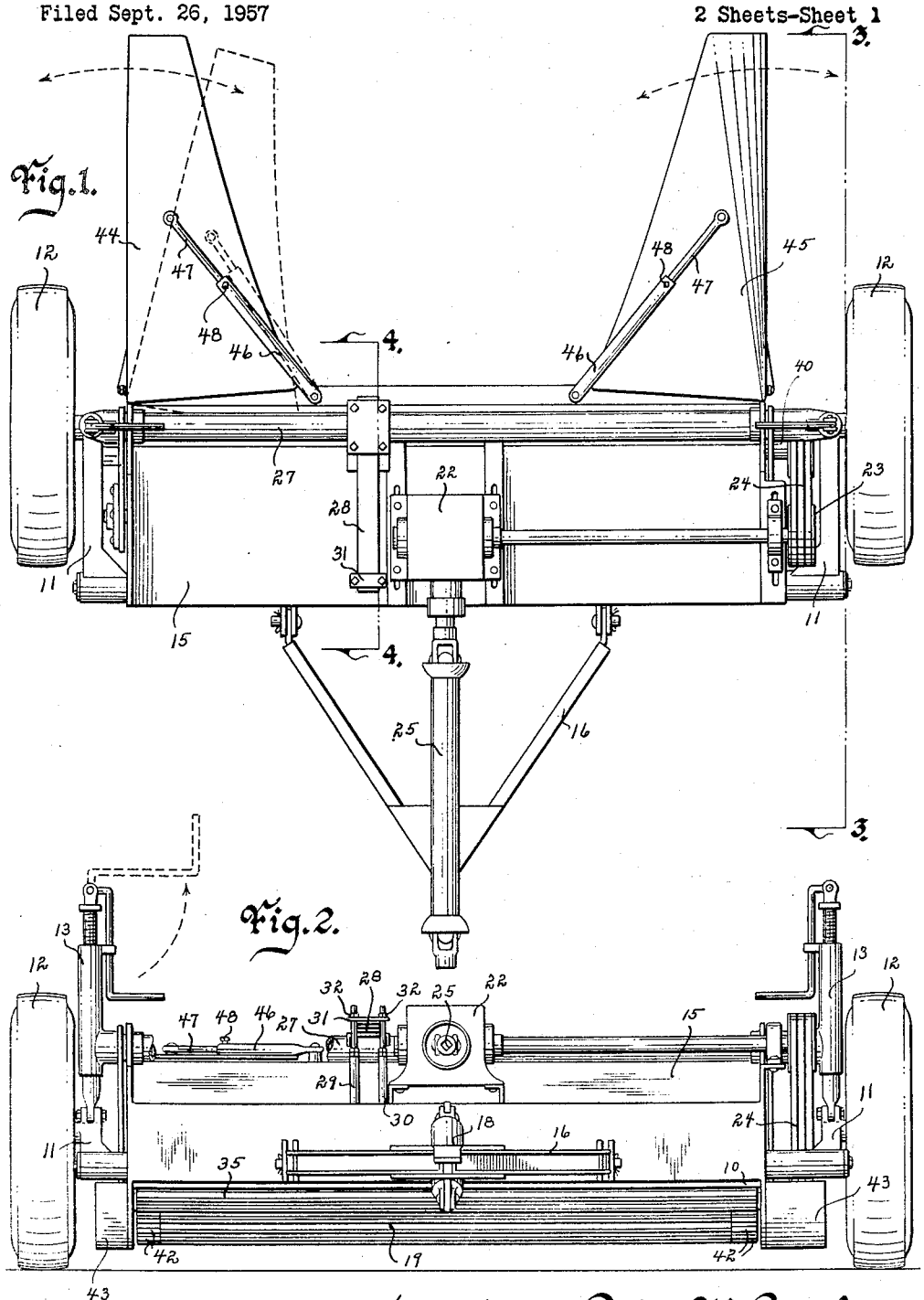

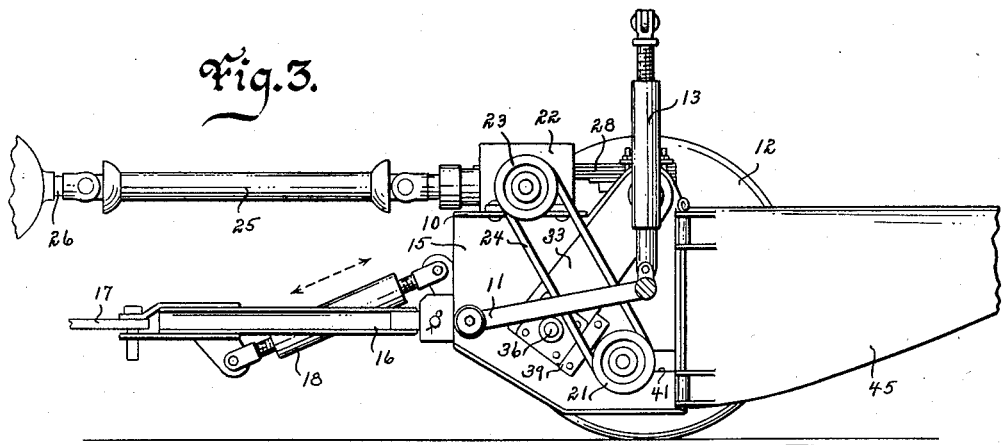
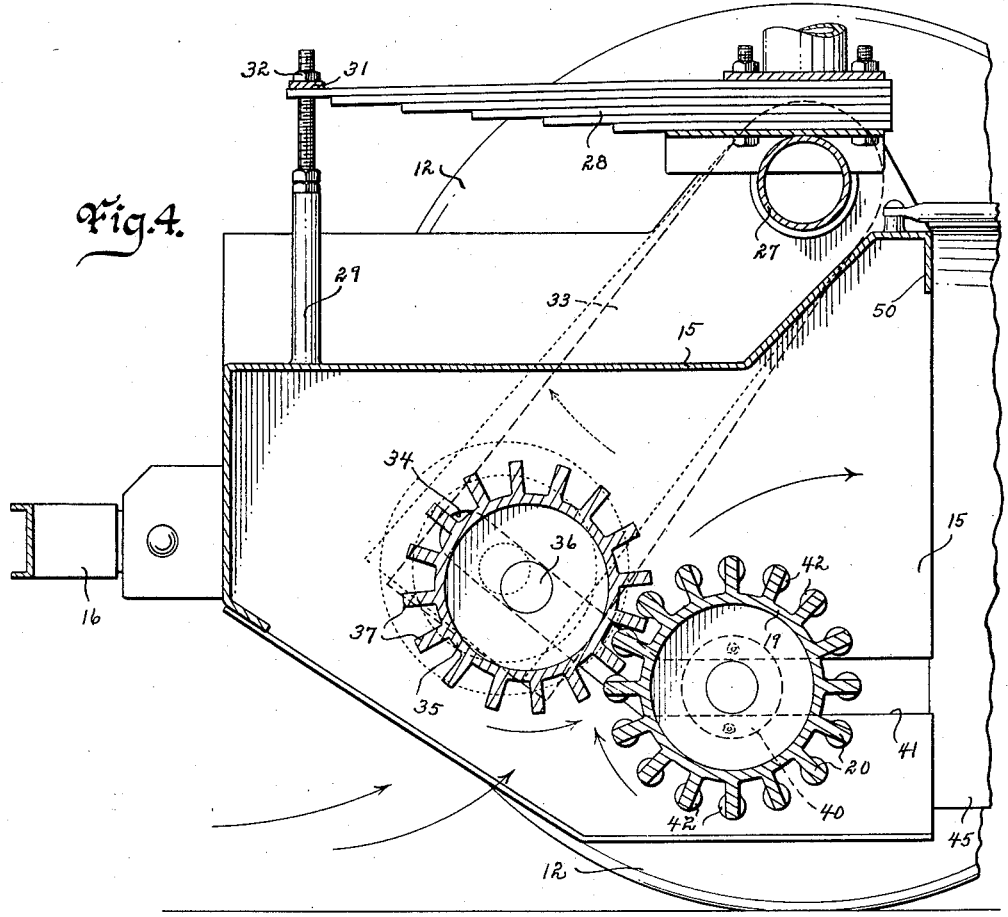

United States Patent Office 2,911,780
Patented Nov. 10, 1959

2,911,780

HAY CONDITIONING IMPLEMENT

Dale W. Brady, Altoona, Iowa

Application September 26, 1957, Serial No. 686,336

9 Claims. (Cl. 56—1)

This invention relates to an agricultural implement for processing hay and like, and more particularly to a device that will bend and crimp the stems of the crop being conditioned.

There are two important problems to be faced by the raisers of animal roughage feeds. First, it is always a critical matter to get the newly cut hay or like sufficiently dried prior to its possible spoilage from rain. Secondly, the dried product must meet the taste requirements of the animals to which it is fed.

Therefore, one of the principal objects of my invention is to provide an implement that will so condition newly cut hay that it will quickly dry, thereby greatly reducing the hazard of spoilage.

A further object of this invention is to provide a hay processing device that makes the hay product exceptionally desired by the animal to which it is fed.

More specifically, the object of this invention is to provide an implement that successfully crimps and/or bends the stems and blades of recently cut hay or the like.

A still further object of my invention is to provide a hay crimping implement that automatically compensates for varying amounts of material passing through it.

A still further object of this invention is to provide a hay crimper that is easily and quickly adjusted to meet all conditions that might be experienced during its use.

Still further objects of my invention are to provide a hay processing implement that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a top plan view of my implement,

Fig. 2 is a front end view of the device and illustrates the method of lowering or raising the crimping cylinders relative to the ground surface, with parts broken away, Fig. 3 is a side view of my hay conditioning unit, with one wheel broken away, taken on line 3—3 of Fig. 1, and more fully illustrates its construction, and Fig. 4 is an enlarged cross sectional view of my implement taken on line 4—4 of Fig. 1.

The function of my device is to pick up the newly cut crop from the ground, crimp and/or bend the stems and blades of the crop, and then deposit the conditioned crop back onto the ground in a much greater vertical depth and in a non-compact layer so that drying air will readily reach all members and parts that make up the processed hay layer. Also, by such crimping and bending, the stems of the crop will be partially broken open at spaced points, thereby permitting plant moisture and water to escape from the netire length of the stem. By the stems and leaves being crimped in angles from all directions, they will obviously hold themselves apart from each other and a very loose layer of hay will result, permitting both air and sunshine to easily penetrate the mass.

In the drawings, I have used the numeral 10 to designate the chassis frame of my implement. At each end of this frame 10 is a rearwardly extending arm 11 hingedly secured at its forward end as shown in Fig. 3. Rotatably mounted on the rear end of each arm is a supporting wheel 12. The numeral 13 designates a screw jack means associated with the rear end of each of the arms 11 and the frame 10, whereby the rear ends of the two arms may be lowered or raised relative to the chassis, thereby lowering or raising the chassis relative to the ground surface. The numeral 15 designates a hood member in the chassis having its rear side open, its bottom open and the lower forward side portion open. The two ends of the hood are closed, but their lower marginal edges extend first horizontally forward, and then forwardly and upwardly, as shown in Fig. 4. Hingedly secured to the lower front side of the chassis is an ordinary tongue 16, adapted to be detachably connected to the drawbar 17 of a tractor. The numeral 18 designates an adjustable brace having one end hingedly connected to the drawbar, its length extending rearwardly and upwardly and its other end hingedly connected to the chassis, as shown in Fig. 3. The numeral 19 designates an elongated cylinder rotatably mounted in the lower portions of the ends of the hood, positioned within the hood, and having a plurality of evenly spaced apart radially extending longitudinal flanges 20. The numeral 21 designates a pulley wheel connected to the cylinder 19 and positioned at the outside of one end of the hood 15. The numeral 22 designates a transmission mounted on the upper forward end of the chassis and having a pulley wheel 23. The numeral 24 designates belts embracing the pulley wheels 21 and 23. The numeral 25 designates a universal shaft means connected to the transmission 22 at one end and adapted to have its other end detachably connected to the power takeoff 26 of the pulling tractor. By this arrangement of parts, the power take-off of the tractor will rotate the cylinder 19 and the rotation will be such that the lower side of flanges 20 will move forwardly and upwardly, as shown by an arrow in Fig. 4. The numeral 27 designates a rotatably mounted shaft positioned above the rear top of the hood 15 and extending parallel with the cylinder 19. Rigidly secured to this shaft 27 is a groupment of leaf springs 28 extending forwardly. The numerals 29 and 30 designate two spaced apart vertical posts on the top of the hood 15. The upper portions of these posts are threaded and they extend at each side respectively of the leaf spring unit. The numeral 31 designates a bar vertically slidably mounted on the two posts and extending over the leaf spring unit, as shown in Fig. 2. The numeral 32 designates nuts threaded onto each of the posts 29 and 30 and positioned above the bar 31. The numeral 33 designates two arms rigidly secured to the shaft 27 and extending forwardly and downwardly at each end respectively of the hood 15. The numeral 34 designates a slot opening in each end of the hood 15. These slots extend downwardly and rearwardly, as shown in Fig. 4. The numeral 35 designates an elongated second cylinder having its length parallel with the length of the cylinder 19, positioned forwardly and upwardly from the cylinder 19, and extending between the two ends of the hood 15. This cylinder has a stub shaft 36 at each end extending through a slot 34. The outer end portions of each of these two stub shafts are rotatably mounted in the lower forward free end portions of the two arms 33, respectively. The numeral 37 designates a plurality of evenly spaced apart radially extending longitudinal flanges on the cylinder 35. The cylinder 35 is of the same diameter as the cylinder 19 and the flanges 37 are of the same number as the number of flanges 20 and mesh with the flanges 20, as shown in Fig. 4. The numeral 39 designates a stop member on each end of the hood 15, limiting the swinging movement of the arms 33 toward the cylinder 19. The bearings 40 of the cylinder 19 are inserted into horizontal slots 41 in the ends of the hood 15 and then bolted as shown in Fig. 4. With the cylinder 19 rotating its flanges 20 meshing with the flanges 37 of the cylinder 35 will cause the cylinder 35 to rotate. The flanges 20 and flanges 37 act as spur gear teeth and the rotation of the cylinder 19 (when viewed as in Fig. 4) will rotate to the right and the cylinder 35 will rotate to the left. However, to provide better driving action of the flanges 20 onto the flanges 37, I have at each end portion of the cylinder 19, rounded and increased the thickness of the flanges 20, as shown in Fig. 4, and designated by the numeral 42. A sled guard 43 is mounted at each side of the hood 15 to protect the cylinder bearings, pulley wheel, belt, arms 33 and like, as shown in Fig. 2.

At each of the two rear corner ends of the chassis, I horizontally hinge a wing side chute. These two chutes are designated by the numerals 44 and 45, respectively, and may be adjustably moved inwardly toward each other or away from each other, as shown in Fig. 1. The adjusting means of each chute consists of a tube 46, hinged at its forward end to the chassis, a rod shaft 47 having its rear end hinged to the chute and its forward end portion slidably extending into the rear end portion of the tube, and with a set screw 48 threaded through the tube wall for contact with the rod shaft. The outer side of each of the chutes is substantially vertical and the outer end of each of the chutes is curved upwardly and inwardly, as shown in Fig. 1. By adjustably positioning these two chutes inwardly toward each other, the processed material from the cylinders 19 and 35 will be windrowed. When the chutes extend directly rearwardly, as shown in Fig. 1, the width of the deposited layer of processed matter will be confined to a width substantially that of the cylinder 19.

In use, the chassis is lowered by the jack means 13 to a point where the teeth flanges 20 of the cylinder 19 will engage the cut hay or like on the ground surface. Obviously, the implement is pulled forwardly over the field and the power take-off of the tractor will cause the rotation of the cylinder 19 which in turn will rotate the cylinder 35. The cylinder 19 is in a horizontal plane below the horizontal plane of the cylinder 35 and, as shown in Fig. 4, the cylinder 35 is positioned forwardly and upwardly relative to the cylinder 19. The hay or like will be picked up by the flanges of the two cylinders and will be forced to pass between the two cylinders and then out the rear open end of the hood 15. With the flange teeth of the two cylinders 19 and 35 meshing with each other, any vegetation passing between the two rollers will be crimped and the crimp bends will be at least three in number between any given two tooth flanges. This crimping of the cut hay or like will at least partially break the skin surface of the stem at each of the bend points, thus permitting the stem to bleed its moisture at spaced points along its entire length. The partial breaking of the stem also permits drying air to enter to the inside of the stem portion. By the stems and leaves being bent, or crimped, into various angles, the material after passing between the two cylinders will hold itself in a loose non-compact mass. Regardless of the thickness of the layer of hay on the ground prior to its passage between the cylinders, its layer thickness after it has passed through my implement will be much greater, thus permitting dry air and sunshine to successfully penetrate the crimped mass. Also, because the material is crimped, it will be easier for the animal to eat the same. The drying action is so rapid after a field has been processed with my equipment that in a relatively short time the processed hay may be baled, stacked or stored. By the use of the spring unit means 28, the cylinder 35 will be yieldingly held in the direction of the cylinder 19. If a large mass of material were to temporarily pass between the cylinders, or if a foreign object were to be picked up and passed between the cylinders, the cylinder 35 is permitted to yieldingly move away from the cylinder 19 and against the action of the spring unit 28. Obviously, the greater the force in holding the cylinder 35 toward the cylinder 19, the greater will be the crimping action of the hay. The yielding force for holding cylinder 35 toward the cylinder 19 is adjustable by the nuts 32. Different types of crops to be processed and different volumes of the material being processed may well require the adjustment of the tension of the spring unit means 28.

To encourage the hay pick up efficiency of the flanges 20, I have made them of slightly greater radial width than that of the teeth 37 of the cylinder 35. A downwardly extending baffle plate in the upper rear end opening of the hood 15 aids in directing and "fluffing" the crimped hay as it moves rearwardly from the implement and back onto the ground surface. I have used the numeral 50 to designate this plate, as shown in Fig. 4.

Some changes may be made in the construction and arrangement of my hay conditioning implement without departing from the real spirit and purpose of my invention, and it is my intention to cover by my claims, any modified forms of structure or use of mechanical equivalents which may be reasonably included within their scope.

I claim:

1. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably and swingably mounted in said hood member, and positioned forwardly and upwardly relative to said first elongated cylinder, radially extending longitudinal fins on said second cylinder and in mesh with the fins of said first elongated cylinder, a means yieldingly holding said second cylinder in its swinging movement toward said first cylinder, and a means for rotating at least one of said cylinders.

2. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably and swingably mounted in said hood member, and positioned forwardly and upwardly relative to said first elongated cylinder, radially extending longitudinal fins on said second cylinder and in mesh with the fins of said first elongated cylinder, a leaf spring means yieldingly holding said second cylinder in its swinging movement toward said first cylinder, and a means for rotating at least one of said cylinders.

3. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably and swingably mounted in said hood member, and positioned forwardly and upwardly relative to said first elongated cylinder, radially extending longitudinal fins on said second cylinder and in mesh with the fins of said first elongated cylinder, an adjustable means yieldingly holding said second cylinder in its swinging movement toward said first cylinder, and a means for rotating at least one of said cylinders.

4. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably and swingably mounted in said hood member, and positioned forwardly and upwardly relative to said first elongated cylinder, radially extending longitudinal fins on said second cylinder and in mesh with the fins of said first elongated cylinder, a means yieldingly holding said second cylinder in its swinging movement toward said first cylinder, a means for rotating at least one of said cylinders, and two material control shields on the rear of said chassis and extending generally rearwardly.

5. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably and swingably mounted in said hood member, and positioned forwardly and upwardly relative to said first elongated cylinder, radially extending longitudinal fins on said second cylinder and in mesh with the fins of said first elongated cylinder, a means yieldingly holding said second cylinder in its swinging movement toward said first cylinder, a means for rotating at least one of said cylinders, and two adjustable material control shields horizontally hinged on the rear of said chassis and extending generally rearwardly.

6. In a hay or like processing implement, a chassis, wheels supporting said chassis, a means for lowering or raising said chassis relative to said wheels, an elongated hood member on said chassis and open at its rear end, an elongated cylinder rotatably mounted in said hood member, radially extending longitudinal fins on said elongated cylinder, a second elongated cylinder rotatably and swingably mounted in said hood member, and positioned forwardly and upwardly relative to said first elongated cylinder, radially extending longitudinal fins on said second cylinder and in mesh with the fins of said first elongated cylinder, a means yieldingly holding said second cylinder in its swinging movement toward said first cylinder, and a means for rotating at least one of said cylinders.

7. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably mounted in said hood member, radially extending longitudinal fins on said second cylinder and in mesh with the fins of said first elongated cylinder, and a means for rotating one of said cylinders; said fins of one of said cylinders having each portion of their length ends rounded and thickened.

8. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably and swingably mounted in said hood member, radially extending longitudinal fins on said second cylinder and in mesh with the fins of said first elongated cylinder, a means yieldingly holding said second cylinder in its swinging movement toward said first cylinder, and a means for rotating at least one of said cylinders; said second elongated cylinder being of the same dameter as that of the diameter of said first cylinder and being generally positioned forwardly and upwardly relative to said first mentioned cylinder.

9. In a hay or like processing implement, a chassis, wheels supporting said chassis, an elongated hood member on said chassis and open at its rear end, an elongated cylinder rotatably mounted in said hood member, radially extending longitudinal fins on said elongated cylinder, a second elongated cylinder rotatably and swingably mounted in said hood member, and positioned forwardly and upwardly relative to said first elongated cylinder, radially extending longitudinal fins on said second cylinder and in mesh with the fins of said first elongated cylinder and of a width less than that of the fins of said first cylinder, a fluffing ledge at the top of the rear open end of said hood member, a means yieldingly holding said second cylinder in its swinging movement toward said first cylinder, and a means for rotating at least one of said cylinders.

References Cited in the file of this patent

UNITED STATES PATENTS

| | | |
|---|---|---|
| 2,502,599 | Smart | Apr. 4, 1950 |
| 2,700,261 | Scarlett et al. | Jan. 25, 1955 |
| 2,711,622 | Cunningham | June 28, 1955 |